United States Patent [19]

Ivanov et al.

[11] 3,926,939

[45] Dec. 16, 1975

[54] METHOD OF EXTRACTING PURE SERUM ALBUMIN FROM BIOLOGICAL FLUIDS USING A SALT OF A CARBOXYLIC ALIPHATIC ACID

[76] Inventors: Mikhail Ivanovich Ivanov, Kuzminki, Moskovskaya Veterinarnaya Akademia, 10, kv. 9; Anatoly Alexandrovich From, ulitsa Flotskaya 28, korpus 1, kv. 84; Anatoly Efimovich Kiseley, ulitsa Kostyakova, 8/6, kv. 182, all of, Moscow; Alexandr Alexandrovich Nikitenko, Krasnogorsky raion, Petrovo-Dalnee, Institut, dom 5, kv. 47, Moskovskaya oblast; Valentin Mikhailovich Rusanov, Slavyansky bulvar, 27, kv. 192, Moscow; Leonid Ivanovich Skobelev, Prospekt Mira, 169, kv. 32, both of Moscow, all of U.S.S.R.

[22] Filed: Aug. 24, 1973

[21] Appl. No.: 391,312

[52] U.S. Cl. .............................. 260/122; 424/177
[51] Int. Cl.² ................. A23J 1/06; C07G 7/00
[58] Field of Search ..................... 260/122, 112 B

[56] References Cited

UNITED STATES PATENTS 2,765,299   10/1956   Porsche et al. .............. 260/112 B X
3,497,492   2/1970    Buck et al. .......................... 260/122

OTHER PUBLICATIONS

Noller, Chemistry of Organic Compounds, 1959, pp. 147–153 and 156.

*Primary Examiner*—Howard E. Schain
*Attorney, Agent, or Firm*—Waters, Schwartz & Nissen

[57] ABSTRACT

A method of extracting pure serum albumin from biological fluids, which comprises treating said biological fluids with a lower aliphatic alcohol at a concentration of 15 to 35% by volume in the presence of 0.1 to 0.6% of a salt of a carboxylic aliphatic acid with a non-toxic cation at a temperature of from 1° to 30°C and at pH from 2 to 5. The concomitant proteins are partly or largely denatured and at pH 4 to 5 are precipitated together with non-protein impurities. The resultant solution of pure serum albumin is separated from the precipitate at pH 4 to 5 and at a temperature of from 1° to 30°C.

7 Claims, No Drawings

METHOD OF EXTRACTING PURE SERUM ALBUMIN FROM BIOLOGICAL FLUIDS USING A SALT OF A CARBOXYLIC ALIPHATIC ACID

The present invention relates to methods of fractionation of proteins and more particularly, to a method of extracting pure serum albumin from biological fluids. In the form of 5 to 20% solutions albumin is widely employed in medicine as a transfusion medium in cases of massive blood loss, traumatic, burning and operation shock, collapse and other haemodynamic disturbances, as well as a preparation for parenteral feeding. Albumin also has laboratory applications. In addition, animal albumin-sera are used in various industries.

Several methods are known in the art for the extraction of albumin from biological fluids, for example from donor blood plasma and serum, by the fractionation of proteins with ethanol. This method gives a good yield of albumin of up to 98% purity by electrophoresis measurements. Along with albumin a number of other valuable proteins are produced by this method. According to this method, the entire process is run at a temperature below zero.

Successive protein fractions are precipitated and extracted from the solution by varying the concentration of ethanol in the solution, its pH and ionic strength.

This method, however, is very time-consuming and involves too many reaction steps.

It is also possible to extract albumin from blood plasma and serum with diethyl ether. This method offers no advantages over the previously described ethanol-extraction technique, and the explosion hazard and toxicity of ether are prohibitive to its application.

It is also known to extract albumin with neutral inorganic salts. According to this method, individual protein fractions are precipitated and extracted from the solution by varying the salt concentration. The main disadvantage of this method is the difficulty involved in the subsequent removal of the considerable amount of salt from the protein solution.

There is another method for the extraction of albumin from blood plasma which employs Rivanol. The latter specifically binds with proteins, causing the precipitation of albumin and part of alpha- and beta-globulins. It is very difficult to obtain pure albumin by the Rivanol process; moreover, this technique calls for exceedingly large reaction volumes.

All the above methods can use as starting material only high-quality donor plasma and serum, whereas there are sources of feedstock for the process, far greater than the donor plasma, such as placental and abortion sera or placental extract, which do not lend themselves to any conventional method of production of pure albumin as being abundantly contaminated with tissue proteins as well as non-protein impurities, such as steroid hormones, haemopigments, etc.

A method was proposed for the processing of such kinds of raw material by removing haemopigments from albumin solutions with zinc salts. However, the method has not found any wide application for the following reasons: to remove the toxic ions of zinc from the solution is rather difficult; the process is too sophisticated and involves too many steps: and the albumin is obtained in low yields.

There is yet another method of extracting albumin from plasma and serum and the purification thereof from haemopigments, which comprises removing haemopigments with ethanol in the presence of citrates, sulphates and hydrochlorides at a temperature below 0°C. This method gives satisfactory results only on condition that the amount of haemopigments in the starting material is limited. Another disadvantage of the method is the need for dialysis as a means of extracting the salts from the albumin solution.

The difficulty with purifying albumin from non-protein impurities, such as haemopigments, bile pigments, or steroid hormones, stems from the fact that the above substances form complexes with albumin, and the presence of such complexes substantially detracts from the efficiency of the conventional methods of purification used in the fractionation of protein mixtures.

It is an object of the present invention to provide an industrial method for the extraction of pure serum albumin not only from donor blood, but also from various other forms of raw material, such as haemolyzed blood plasma, placental and abortion sera and placental extract.

In accordance with the object of the invention, there is provided a method for the extraction of pure serum albumin from biological fluids, which comprises treating such fluids with a lower aliphatic alcohol and a salt of a carboxylic acid, whereby, in accordance with the invention, the treatment is carried out at a volume concentration of the alcohol of 15 to 33% in an presence of 0.1 to 0.6% of the aliphatic carboxylate having a non-toxic cation and an anion comprising from 6 to 12 carbon atoms at a temperature of from 1° to 30°C and pH of from 2 to 5, the concomitant proteins being partly or largely denatured, depending on the pH value selected for the process; the denatured and native concomitant proteins are precipitated at a pH value of from 4 to 5 and at a temperature of from 1° to 30°C, with the non-protein impurities which form complexes with the albumin being split off therefrom and adsorbed by the precipitate; the resultant solution containing pure serum albumin is separated from the precipitate at a temperature of from 1° to 30°C and pH of from 4 to 5.

The alcohol is preferably ethanol taken to the extent of 25% by volume; the preferred fatty acid salt is sodium caprylate taken in a 0.3% concentration; the preferred pH value of the treatment is 3.3 to 4.6, especially 3.3 to 3.5; and the preferred temperature is from 15° to 22°C.

At a volume concentration of alcohol below 15% the purity of the extracted albumin is impaired, whereas volume concentrations of alcohol in excess of 35% might lead to irreversible changes in the conformation of the albumin molecule.

According to the invention, the fatty acid salt is to be necessarily employed in the concentration range 0.1 to 0.6%.

At a salt concentration below the above limit the degree of purification of the serum albumin extracted is insufficient. Fatty acid salt concentrations in excess of the said range are impracticable as liable to cause excessive albumin losses. If the reaction is carried out in a medium with a pH less than 2, the extracted albumin will not have more than normal purity but will be more amenable to denaturation, whereas at a pH higher than 5 the albumin purity will be insufficient. The process shall be carried out at a temperature not exceeding 30°C, for any further increase in temperature might result in irreversible denaturation changes in the albumin. If the temperature of the reaction mixture is decreased, the rate of albumin precipitation is higher the closer the temperature to 0°C. If the temperature drops below 1°C, the losses of albumin will be extremely high, to the extent of its total precipitation and removal together with the impurities.

The method of this invention is based on the combined effect of an alcohol and a fatty acid anion under conditions of an acidic reaction and a positive temperature. The combined effect of the said four factors is a prerequisite for the extraction of adequately pure albumin. The acidic reaction of the medium and the alcohol have the effect of causing dissociation of the complexes of the albumin with the non-protein impurities which are displaced by the fatty acid anion and separate.

Having separated from the albumin, said impurities are adsorbed by the precipitate of the concomitant proteins and removed therewith.

Thus, the removal of the concomitant proteins is effected by way of a selective acid-alcoholic denaturation followed by the precipitation of the proteins at a positive temperature and the simultaneous removal of the non-protein impurities adsorbed thereon.

Positive temperatures (above 0°C) are required to prevent alcohol-induced albumin precipitation. Furthermore, the positive temperature boosts the denaturating effect of the alcohol and the acid reaction on the proteins to be removed from the solution. If it is desirable to preserve the proteins to be removed in their native state for the purpose of their subsequent utilization, then the bulk of these proteins may be pre-extracted with an alcohol and a fatty acid anion under sufficiently mild conditions to provide for the preservation of their native properties.

The proposed method is effected in the following manner. As starting material, use is made of donor blood plasma, placental or abortion sera, placenta extract or mammal blood plasma, wherefrom other fractions, such as fibrinogen or gamma-globulin, may be pre-extracted by the known methods.

A lower aliphatic alcohol, preferably ethanol, is added to the protein solution and the concentration of the former, is brought to within 15 to 35% by volume; then an aliphatic acid salt of 0.1 to 0.6% concentration is added; and at a temperature of from 1 to 30°C the pH value of the solution is adjusted to within the range of from 2 to 5.

Depending on the pH selected, the concomitant proteins are partly or largely denatured. After that, the pH of the medium is adjusted to 4–5, the temperature being maintained within the range of 1 to 30°C. Under this set of conditions, the denatured and native proteins separate from albumin and are precipitated together with the non-protein impurities. The resultant solution containing pure serum albumin is separated from the precipitate at pH from 4 to 5 and at a temperature between 1° and 30°C.

The proposed method yields an albumin applicable for medical and laboratory purposes, whose purity in terms of proteins is up to 100% (by electrophoresis measurements) and which contains haemopigments and other harmful impurities in amounts which fail to affect the utility of the albumin.

The invention will be better understood from the following examples of implementation of the proposed method for the extraction of pure serum albumin.

EXAMPLE 1

50 l of a mixture of placental and abortion sera is taken. After gamma-globulin has been removed from the mixture by any known method, for example one of E. Cohn's methods, the concentration of ethanol in the solution is brought to 25% by volume and the temperature is set at 20°C. The mixture being unceasingly stirred, sodium caprylate is added until its concentration has reached 0.3%. Then the pH of the mixture is adjusted to 3.3 by the addition thereto of 1 N of hydrochloric acid at the said temperature, and then the mixture is held at this pH for 30 min. to ensure the maximum possible denaturation of the concomitant proteins. After that the pH of the medium is adjusted to 4.5 and the denatured proteins are precipitated together with the non-protein impurities split off from the albumin. The solution containing pure albumin is separated from the resultant precipitate at a temperature of 20°C and pH 4.5 by centrifugation (the pH is adjusted with 1 N solution of sodium hydroxide). The resultant centrifugate is additionally purified by filtration. The albumin in the centrifuge may be concentrated by any known method, for example by precipitation with ethanol at a volume concentration of 20 to 40% as precipitant at a temperature of from −6° to −8°C, with the precipitate thus formed subsequently dissolved in water and lyophilized. The albumin extracted is shown by electrophoresis to contain practically no other proteins, i.e. it is 100% pure. The yield of the albumin amounts to 18 to 22 g per one liter of the serum.

EXAMPLE 2

The starting material is donor plasma.

Fibrinogen, prothrombin, fibrinolysin and gamma-globulin are extracted by any known method from 50 l of the plasma; the concentration of alcohol is set at 20%; sodium caprylate is added until its concentration has reached 0.3%; the pH is adjusted to 4.5; and the solution is held at this pH for 20 min. at a temperature of 10°C. The precipitate formed is separated by centrifugation. It may be used for the extraction of alpha- and beta-globulins and for an additional extraction of albumin. The resultant centrifugate contains albumin of insufficient purity. Therefore, the process is repeated, for which purpose the pH of the centrifugate is adjusted down to 3.3 and then the process is carried on in the manner described in Example 1.

EXAMPLE 3

The starting material is placental extract containing 2.5% of protein.

The process is similar to that of Example 1, with the only exception that sodium caprylate is added until its concentration has reached 0.2%.

EXAMPLE 4

The starting material is bovine blood serum.

96% alcohol is added to 50 l of such serum until the concentration of the alcohol in the solution has reached 25% by volume. Then sodium caprylate is added until its concentration in the solution has reached 0.3%. After sodium caprylate has been dissolved, the pH of the solution is adjusted to 3.3 by adding 1N hydrochloric acid. The solution is held at this set of conditions at a temperature of 20°C for 40 min., whereupon the pH is adjusted to 4.5 by adding 1N sodium hydroxide solution. The resultant precipitate is separated by centrifugation at the above values of pH and temperature. The precipitate having been separated, the temperature of the centrifugate is decreased to −8°C and then the solution is held for 48 hours to permit precipitation. The separated precipitate comprises pure albumin and traces of globulins.

EXAMPLE 5

Methanol is added to 1 l of placental serum until the concentration of the alcohol has reached 30%; then sodium caprylate is added until its concentration has reached 0.3% the pH is adjusted to 2.5 after which the mixture is held at this pH for 20 min. Then the pH is adjusted to 4.6 and the concomitant proteins and non-protein impurities are precipitated. The solution containing pure albumin is separated by centrifugation.

EXAMPLE 6

Ethanol and sodium caproate are added to 1 l of placental serum until their respective concentrations have reached 20 and 0.45%; the pH is adjusted to 3.3; subsequently the process is carried on in the manner described in Example 1.

EXAMPLE 7

Ethanol and sodium caproate are added to 1 l of placental serum until their respective concentrations have reached 25 and 0.3%; the pH of the mixture is adjusted to 3.3; subsequently the process is carried on in the manner described in Example 1.

What is claimed is:

1. A method of extracting pure serum albumin from biological fluids, which comprises the steps of treating biological fluids with a lower aliphatic alcohol at a volume concentration of 15 to 35% in the presence of 0.1 to 0.6 weight percent of the solution of a salt of a carboxylic aliphatic acid with a non-toxic cation and anion containing from 6 to 12 carbon atoms at a temperature of from 1° to 30°C. and a pH of from 3.3. to 3.5, whereby the concomitant proteins are at least partly denatured; precipitating the denatured and native concomitant proteins at a pH from 4 to 5 and at a temperature of from 1° to 35°C, whereby the non-protein impurities which form complexes with the albumin are split off therefrom and adsorbed by the resulting precipitate; and separating the solution containing pure serum albumin from said precipitate at a temperature of from 1 to 30°C and at pH of from 4 to 5.

2. A method according to claim 1, wherein the lower aliphatic alcohol is ethanol.

3. A method according to claim 1, wherein the salt of a carboxylic aliphatic acid is sodium caprylate.

4. A method according to claim 1, wherein the salt of a carboxylic aliphatic acid is sodium caproate.

5. A method according to claim 1, which is carried out at a temperature of from 15 to 22°C.

6. A method according to claim 1, wherein the solution containing pure albumin is separated from the precipitate by centrifugation.

7. A method according to claim 1 wherein the salt of a carboxylic aliphatic acid is sodium caprate.

* * * * *